Dec. 27, 1927. Re. 16,832

C. O'DELL

SHINGLE CONSTRUCTION

Original Filed Aug. 26, 1925

Inventor

Charles O'Dell

By his Attorneys

Dean Fairbank Albright & Hirsch

Reissued Dec. 27, 1927. Re. 16,832

UNITED STATES PATENT OFFICE.

CHARLES O'DELL, OF BROOKLYN, NEW YORK, ASSIGNOR OF ONE-HALF TO FREDERICK T. REGER, OF BROOKLYN, NEW YORK.

SHINGLE CONSTRUCTION.

Original No. 1,593,551, dated July 20, 1926, Serial No. 52,549, filed August 26, 1925. Application for reissue filed October 27, 1926. Serial No. 144,636.

This invention relates generally to shingles used for roofing purposes, the invention having more particular reference to a novel type of roofing shingles. The invention has for an object the provision of an improved roofing shingle of metal, composition, or the like; which may be easily and readily attached to the roof, and which will act more efficiently in preventing leaks. A further object is to provide a shingle construction embodying a clip of novel design and application, which will more effectively hold the butt of the shingle stiff and straight, will prevent said butt from being lifted by wind or warping, and may be attached to the shingle and will hold the butt to the roof without the use of nails or other separate fastening means piercing the shingle therebeneath.

For further comprehension of the invention, and of the objects and advantages thereof, reference will be had to the following description and accompanying drawing, and to the appended claims in which the various novel features of the invention are more particularly set forth.

Figure 1 of the drawing is a fragmentary plan view of a roof structure constructed in accordance with my invention.

Figure 1:
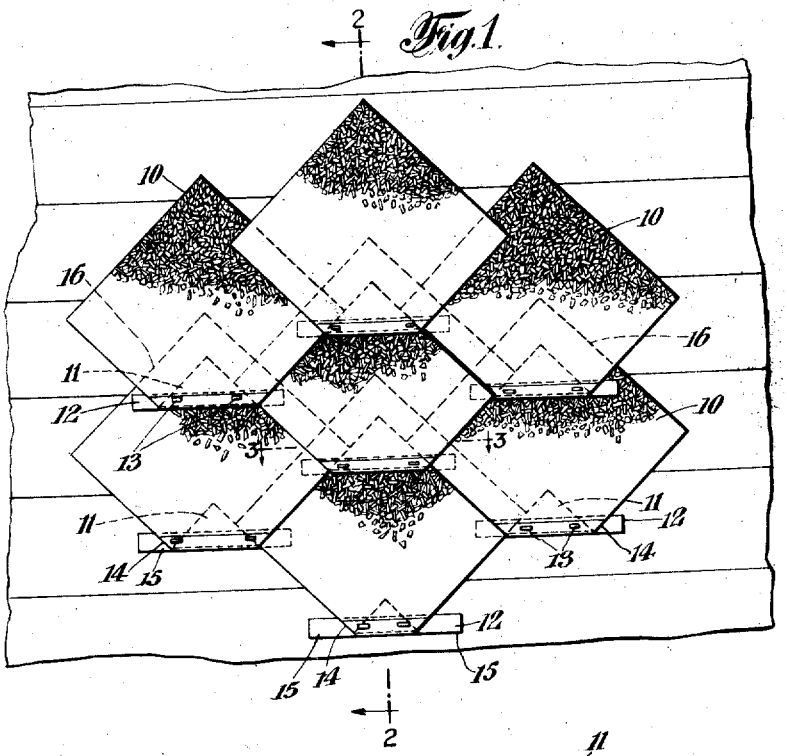
Figure 2:
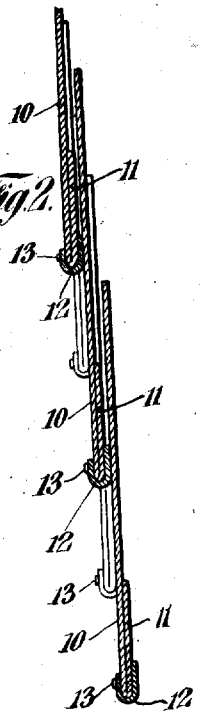
Figure 2 is a sectional view taken on the line 2—2 of Figure 1.
Figure 3:
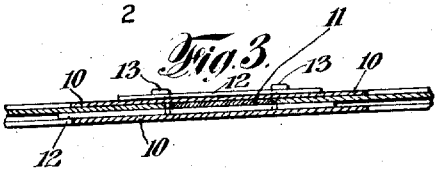
Figure 3 is a fragmentary sectional view, taken on the line 3—3 of Figure 1.

The shingles 10 are preferably square and in forming the roof structure are preferably laid with their diagonals horizontal, so that a corner of the shingle is uppermost and the two exposed edges converge downwardly. The lowermost corner 11 is turned back or folded beneath the body portion so as to present a butt of double thickness.

Secured to the turned back or folded corner of the said shingle 10, is a clip 12 preferably of metal, and secured to the shingle in any desired manner, but preferably by tongues 13 struck from the clip and caused to pierce the shingle. These may pass through conveniently located holes or slots in the front portion of the clip 12, the said tongues 13 being then forced downward against the said clip.

The clip is bent lengthwise so as to completely receive and engage with the opposite side of the turned back or folded edge of the shingle. The front or top portion of the clip is of a length substantially equal to the length of the fold of the shingle and may be cut at an angle 14 to coincide with the downwardly converging edge of the shingle to which said clip is attached. The rear portion of the clip is of greater length so that its end portions extend beyond the side edges of the shingle. The end of said back portion of the clip may be cut at right angles to the line of said bend, as designated by 15 in the accompanying drawing.

Figure 4:
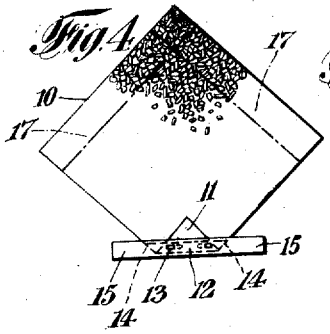
Figure 4 is a view of the back or rear of a shingle showing the clip attached thereto.
Figure 6:
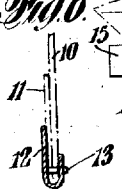
Figure 6 is a section taken on the line 6—6 of Figure 5 on a larger scale.
Figure 5:
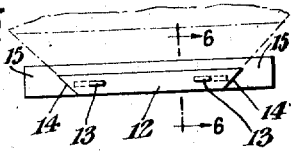
Figure 5 is a front view of the clip, showing a portion of the shingle in dotted lines.

Referring in particular to Figure 4 of the accompanying drawing, the dotted lines 17 denote suitable markings to designate the relative positions of the adjacent shingles when the said shingles 10 are placed in position on the roof.

Referring in particular to Fig. 1 of the accompanying drawing it will be understood that the said shingles are placed on the roof so as to overlap one another as shown by the dotted lines 16, and further that the hereinbefore described clip will serve to hold the shingles, adjacent to which the said clip is attached, in place, as shown in Fig. 1 of the accompanying drawing.

The ends of the back portion of the clip extend beneath adjacent shingles so as to hold the butt down without the aid of nails. Furthermore, it holds the butt stiff and rigid by reason of the double thickness of metal and it protects the edge of the shingle by reason of the fact that it is on the outside of the fold.

While I have above described the preferred form, construction, and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention, what I claim as new, and desire to protect by Let-ters Patent of the United States is as follows:—

1. A shingle having its lowermost corner turned back, and a clip having a back portion and a front portion completely encasing the edge of the said turned back corner, said front portion being cut at an angle to coincide with the edges of the shingle, said back portion being of greater length than the width of the shingle at the said turned back corner, and projecting from both sides of said shingle, and said back portion having struck out tongues engageable in apertures of said front portion.

2. A shingle having its lowermost corner turned back, a clip having a back portion and a front portion completely encasing the edge of the said turned back corner, said front portion being cut at an angle to coincide with the edges of the shingle, said back portion being of greater length than the width of the shingle at the said turned back corner, and projecting from both sides of said shingle, and said back portion having struck out tongues engageable in apertures of said front portion, and of sufficient length to be forced downward against the said clip.

3. In a shingle of the class described, a clip having a back portion and a front portion completely encasing the edge of the turned back corner, said front portion being cut at an angle to coincide with the edges of the shingle, said back portion projecting from both sides of said shingle, being of greater length than the width of the shingle at the encased edge of the turned back corner, and said back portion having struck out tongues engageable in apertures of said front portion, said tongues being of sufficient length to be forced downward against the said clip.

4. A shingle having downwardly converging side edges and the lowermost corner turned back, in combination with a sheet metal clip folded along its length to encase the folded edge of the shingle, and presenting a back portion and a front portion, said front portion being of a length substantially equal to the length of the fold of the shingle, and said back portion being of a greater length and projecting beyond said converging edges whereby the projecting ends of the back portion may lie beneath adjacent shingles and thereby prevent raising of said folded edge.

5. A shingle having a butt presenting a lower edge and downwardly converging side edges each disposed at substantially 45 degrees to said lower edge, and a sheet metal clip bent along its length to encase said lower edge and to form front and back portions, said front portion being of a length substantially equal to the length of said lower edge and said back portion being of greater length than said lower edge and projecting beyond said side edges whereby the projecting portions may be disposed beneath the edges of contiguous shingles to prevent lifting of said lower edge.

6. A shingle having a butt presenting a lower edge and downwardly converging side edges, and a sheet metal clip bent along its length and secured to said butt along said lower edge to encase said edge with front and back portions, said back portion being of greater length than said lower edge and projecting beyond said side edges; whereby said lower edge is protected and stiffened and the butt is held down by the engagement of the projecting ends of the clip beneath the edge of contiguous shingles and said clip having parts projecting into said shingle to prevent separation of the shingle and clip.

7. A shingle having a butt presenting a lower edge and downwardly projecting side edges, and a sheet metal strip bent along its length to substantially U-form to provide front and back portions disposed upon opposite sides of said lower edge, said back portion projecting beyond said side edges and one of said portions having tongues projecting therefrom into the shingle to retain the strip in position.

CHARLES O'DELL.